Jan. 12, 1926.                    1,568,965
J. D. DOURAS
LICENSE PLATE HOUSING
Filed June 15, 1925
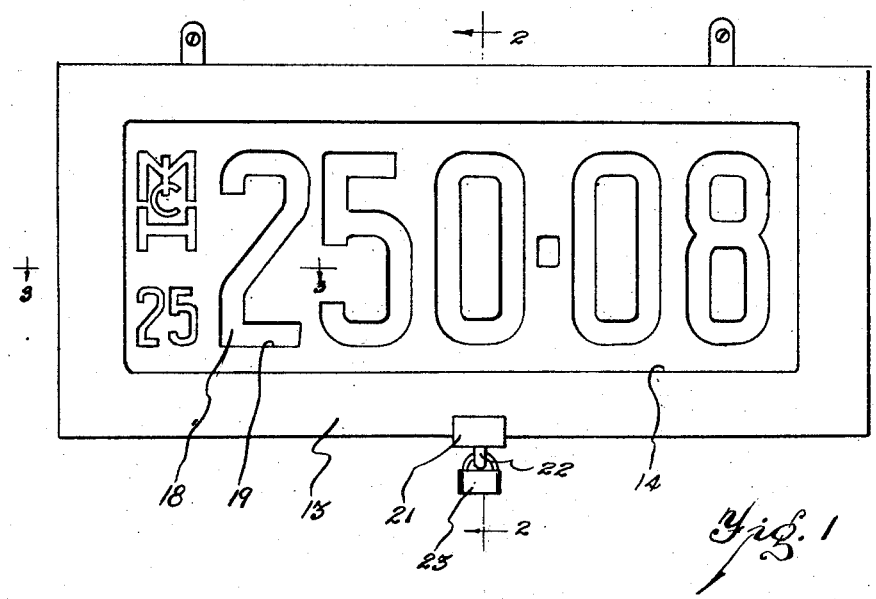
Fig. 1
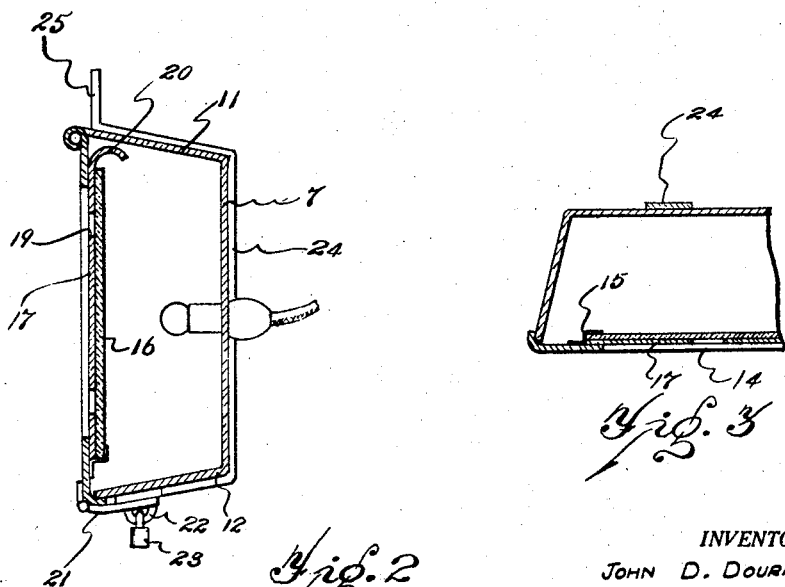
Fig. 2
Fig. 3
INVENTOR.
JOHN D. DOURAS
BY
ATTORNEY.

Patented Jan. 12, 1926.

1,568,965

UNITED STATES PATENT OFFICE.

JOHN D. DOURAS, OF DETROIT, MICHIGAN.

LICENSE-PLATE HOUSING.

Application filed June 15, 1925. Serial No. 37,140.

*To all whom it may concern:*

Be it known that I, JOHN D. DOURAS, a citizen of the United States, residing at Detroit, in the county of Wayne and State of Michigan, have invented a new and useful Improvement in a License-Plate Housing, of which the following is a specification.

My invention relates to a new and useful improvement in a license plate housing and has for its object, the provision of a license plate housing adapted for supporting a license plate in such a manner that the license plate may be illuminated by illuminating means positioned in the housing.

Another object of the invention is the provision of a housing of this class, which will be simple of structure, economical of manufacture and highly efficient in use.

Another object of the invention is the provision in combination with a housing of this class, of a license plate having indicating media perforated therein and having its upper edge angularly turned, to provide a gripping surface.

Another object of the invention is the provision of a housing of this class having a supporting member extending around a majority of the sides, and adapted for attachment to a supporting surface.

Other objects will appear hereinafter.

The invention consists in the combination and arrangement of parts hereinafter described and claimed.

The invention will be best understood from a reference to the accompanying drawings, which form a part of this specification and in which, Fig. 1 is a front elevational view of the invention, Fig. 2 is a sectional view taken on substantially line 2—2 of Fig. 1.

Fig. 3 is a fragmentary sectional view taken on substantially line 3—3 of Fig. 1.

As shown in the drawings, the invention comprises a housing having a rear wall 7, in which is positioned a light bulb socket 8, suitably connected by the wire 9 to a source of electrical energy, a light bulb 10 being adapted for mounting in the socket 8 for illuminating the interior of the housing. As shown, the top wall 11 is inclined to the back wall 7, as is likewise the bottom wall 12. Hingedly mounted on the outer edge of the top wall 11 is a door frame 13 positioned on the inner surface of which and extending around three sides of the opening 14 of the frame 13 is a strip of metal 15, angularly turned, to provide channels for the reception of a closure 16 and the license plate 17. The numbers 18, which may be termed "indicating media" are punched in the licence plate 17, which is preferably made from sheet metal. If desired, the closure 16 may be made from glass, which is colored red, green or any other suitable color, so that when the light bulb 10 is lighted, the red, green or other colored light will shine through the perforations 19 outlining the indicating media 18. As shown in Fig. 2, the upper end 20 of the license plate is angularly turned, to provide a gripping surface, so that, when the door frame 13 is opened sufficiently, the license plate may be slid outwardly from engagement with the guide strip 15. A suitable clasp 21 is mounted on the frame at its lower edge and adapted to co-operate with a staple 22 to retain the closure in operative position, a suitable lug 23 being attached to the staple 22. If desired, a latch member may also be mounted on the frame 13, to retain the closure in operative position.

The device is intended for use with vehicles, particularly automobiles, and affords a means for detachably mounting the license plate upon the vehicle in such a way that it may be removed at will, so that, when it is necessary to replace the license plate, no permanent attaching means are loosened or removed, with a consequent elimination of wear resulting from removal or replacement of attaching means.

The invention, by having the numbers perforated in the license plate and the housing illuminated permits an easy reading of the numbers on the license plate, so that the license plate may be easily read at night time from a great distance.

The device also will serve as a tail light for automobiles, so that the use of a tail light in addition to the housing may be dispensed with.

For attaching the device to the vehicle, there is provided, as shown in the drawings, a pair of hangers, each of which comprises a substantially U-shaped strap 24 of metal, which is adapted to embrace the housing on three sides, is provided with the angularly turned attaching portion 25. The method of mounting the strap on the housing, permits a secure and rigid fastening of the device to a vehicle, so that vibration is eliminated and the life of the housing considerably increased over other methods of support.

The angularly turned attaching portions 25 also serve as an abutment to limit the swinging of the door frame 13, when it is open, to a certain position.

By having the upper wall 11 and the lower wall 12 inclined in the manner indicated in Fig. 2, the seepage of rain or moisture into the housing is reduced to a minimum, which adds to the efficiency of the device by assisting in maintaining it operative at all times, and increases the longevity of its life because of protection from the elements.

While I have illustrated and described the preferred form of structure, I do not wish to limit myself to the precise form of structure shown, but desire to avail myself of such variations and modifications as come within the scope of the appended claims.

What I claim is:

1. A device of the class described, comprising a housing; illuminating means mounted in said housing; a door frame swingably mounted on said housing; guide members mounted on the inner surface of said door frame, adjacent the lower and side edges thereof; a transparent plate mounted in said guide members removably; a metallic plate slidably mounted in said guide members intermediate said frame and said transparent member, said metallic plate having indicating media perforated therein, the upper edge of said metallic plate being angularly turned, to provide a gripping portion for facilitating the removal of said metallic plate from said guide members upon the swinging of said door frame to an open position beyond a predetermined degree; and supporting means embracing said housing on three sides, and adapted for serving as an abutment for preventing the swinging of said door frame open beyond a predetermined degree.

2. A device of the class described, comprising a housing; illuminating means mounted in said housing; a door frame swingably mounted on said housing; guide members mounted on the inner surface of said door frame, adjacent the lower and side edges thereof; a transparent plate mounted in said guide members removably; a metallic plate slidably mounted in said guide members intermediate said frame and said transparent member, said metallic plate having indicating media perforated therein, the upper edge of said metallic plate being angularly turned, to provide a gripping portion for facilitating the removal of said metallic plate from said guide members upon the swinging of said door frame to an open position beyond a predetermined degree; supporting means embracing said housing on three sides, and adapted for serving as an abutment for preventing the swinging of said door frame open beyond a predetermined degree; and U-shaped supporting members attached to and in engagement with the lower rear and upper walls of said housing and having an angularly turned portion, adjacent the outer edge of said upper wall, adapted for attachment to a supporting surface, said angularly turned portion being adapted for engaging said door frame upon the swinging of said door frame open beyond a predetermined degree for limiting the swinging movement of said door frame.

In testimony whereof, I have signed the foregoing specification.

JOHN D. DOURAS.